United States Patent Office 3,000,877
Patented Sept. 19, 1961

---

3,000,877
PRODUCTION OF EPSILON-CAPROLACTAM FROM 6-ACETOXY CAPROIC ACID AND ITS LACTONE ADDUCTS
Benjamin Phillips, Charleston, Samuel W. Tinsley, South Charleston, and Paul S. Starcher, Charleston, W. Va., assignors to Union Carbide Corporation, a corporation of New York
No Drawing. Filed June 8, 1959, Ser. No. 818,504
4 Claims. (Cl. 260—239.3)

This invention relates to a process for the production of epsilon-caprolactam. More particularly, this invention is directed to a non-catalytic process for the production of epsilon-caprolactam by the reaction of 6-acetoxycaproic acid and its lactone adducts with aqueous ammonia under superatmospheric pressures and in the temperature range of 300° C. to 475° C. More specifically it is an object of this invention to provide a one-step process for the production of epsilon-caprolactam. A particular object of this invention is to provide a process for the production of epsilon-caprolactam to the substantial exclusion of polymerized material and in high yield efficiencies from the 6-acetoxycaproic acid and its lactone adducts to epsilon-caprolactam. A further object of this invention is to provide a continuous process for the production of epsilon-caprolactam. These and other objects will become readily apparent to those skilled in the art in light of the teachings herein set forth.

Lactams are used for the production of polyamides suitable for the manufacture of fabrics, film, fibers, coating compositions and the like. Heretofore, the usual preparation of lactams has been by Beckmann rearrangement of ketoximes. Caprolactam, the most important member of this class, has long been prepared by rearangement of cyclohexanone oxime. However, it has been necessary to prepare cyclohexanone oxime intermediate by means of one or more reactions. For example, the preparation of the oxime by treating nitrocyclohexane or its salt with hydroxylamine, hydrogen, sulfur, sodium nitrite, and the like is well known in the art. It is also known to prepare cyclohexanone oxime by treatment of cyclohexanone-bisulfite complexes with nitrous acid and like processes. Although such multistep processes for the preparation of lactams have generally produced satisfactory products, the most desirable process is one whereby lactams could be prepared in a single and inexpensive reaction. This invention provides a new and inexpensive, non-catalytic method of producing epsilon-caprolactams by using inexpensive raw materials with the use of standard equipment.

The present invention is based on the discovery that epsilon-caprolactam can be produced by reacting 6-acetoxycaproic acid and its lactone adducts with aqueous ammonia under superatmospheric pressures and high temperatures. The maximum yield of monomeric epsilon-caprolactam in this invention approximates 50 percent per pass since the process involves a complex mixture of equilibria. However, recycling the reaction products after removal of the formed monomeric epsilon-caprolactam under the conditions identical to those of the initial reactions, produces yield efficiencies of epsilon-caprolactam as high as 85 to 95 percent to the substantial exclusion of polymeric products.

The process of this invention is readily accomplished by heating 6-acetoxycaproic acid and its lactone adducts in a pressure vessel with ammonium hydroxide over a temperature range of about 300° C. to 475° C., preferably in the range of 350° C. to 425° C., for a sufficient period of time to produce the epsilon-caprolactam. The reaction mixture upon cooling, is subjected to conventional recovery procedures such as extraction with chloroform followed by distillation to recover the epsilon-caprolactam thus produced.

The starting material, 6-acetoxycaproic acid and its lactone adducts, is represented by the following formula:

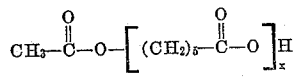

wherein $x$ represents 1 through 5 units. The starting materials used to form the epsilon-caprolactam can exist in the following forms and combinations thereof as follows:

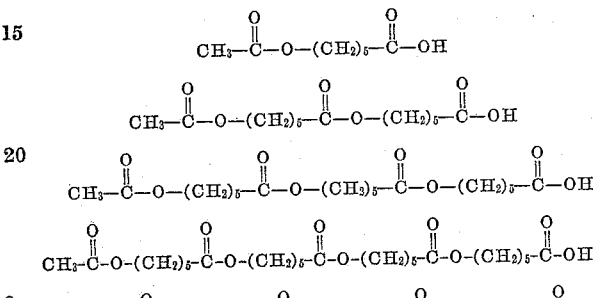

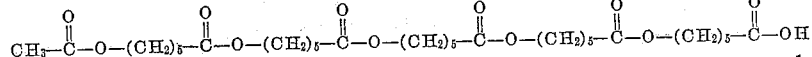

The saponification equivalents of the above compounds can range from 87 to 106, where the saponification equivalent is the weight of product, in grams, which will react with one gram-mole of base under standard saponification conditions.

Concentrations of ammonium hydroxide for purposes of this invention can range from 2 to 80 percent although these concentrations are not critical. Molar ratios of ammonia to 6-acetoxycaproic acid and its lactone adducts can vary from about 1:1 to about 20:1 and more preferably from about 3:1 to about 10:1. While ratios above and below these amounts can also be employed they are a less preferred embodiment of this novel process. The water diluent aids in the reaction to form the monomeric epsilon-caprolactam.

The 6-acetoxycaproic acid and lactone adducts can be dissolved in inert organic solvents such as toluene, benzene, ethylbenzene, ortho-xylene, para-xylene, meta-xylene and the like to facilitate adding the starting materials to the reactants of ammonia in water. The presence of the organic solvents in the reaction of epsilon-caprolactone with ammonia did not significantly affect the reaction.

The process of this invention can be carried out continuously, the residence time in the reaction zone being such that, in view of the high temperature and superatmospheric pressures, maximum conversions will be obtained.

The time of reaction is not necessarily critical and may vary from 10 minutes to as much as a day depending on the reaction conditions.

The term "superatmospheric pressures," as used herein, is defined as the pressures produced by the reactants on heating in a closed vessel or pressures as high as 680 atmospheres, if desired. This pressure is maintained for the duration of the reaction.

The epsilon-caprolactam may be isolated from the reaction mixture by extraction with chloroform or some other water-insoluble solvent and further purified by fractional distillation. The unused 6-acetoxycaproic acid, its lactone adducts and equilibrium products may then be recycled for further reaction.

The following examples illustrate and describe the process involving the production of epsilon-caprolactam in accordance with the invention.

EXAMPLE I

*Preparation of epsilon-caprolactam from 6-acetoxy-caproic acid*

A mixture of 60 grams (0.345 mole) of 6-acetoxy-caproic acid and 268 grams (4.4 moles) of 28 percent aqueous ammonia was heated to 350° C. for a period of 2.5 hours in a stainless steel bomb. The reaction mixture was extracted with chloroform and chloroform layer was evaporated to dryness, leaving an 11 gram residue (28 percent yield). The residue was extracted with petroleum ether. The petroleum ether extracts, upon cooling, gave 1 gram of epsilon-caprolactam, melting point 64–65° C.

EXAMPLE II

*Preparation of epsilon-caprolactam from the lactone adducts of 6-acetoxycaproic acid*

An ester acid (145 grams) characterized by the formula:

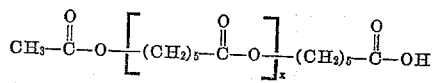

and having a saponification equivalent of 104.5 was charged to a 3-liter stainless steel bomb together with 875 grams of 28 percent aqueous ammonia and heated to 350° C. for 18.5 hours. The reaction mixture was extracted with chloroform, and the chloroform layer was distilled to yield 57 grams of epsilon caprolactam of melting point 66°–69° C. The yield was 36.4 percent of the theoretical.

What is claimed is:

1. A process for the production of epsilon-caprolactam which comprises reacting a member of a group consisting of 6-acetoxycaproic acid, and 6-acetoxycaproic acid lactone adducts, said members characterized by the formula:

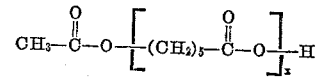

wherein $x$ represents 1 through 5 units, with aqueous ammonia under pressures in the range consisting of autogenous pressure to 680 atmospheres and in the temperature range from about 300° C. to about 475° C. for a sufficient period of time to produce epsilon-caprolactam.

2. The process of claim 1 wherein the temperature ranges from about 350° C. to about 425° C.

3. The process of claim 1 wherein the 6-acetoxycaproic acid lactone adduct has a saponification equivalent in the range of 87 to 106.

4. A process for the production of epsilon-caprolactam which comprises reacting 6-acetoxycaproic acid with aqueous ammonia under pressures in the range consisting of autogenous pressure to 680 atmospheres and in the temperature range from about 300° C. to about 475° C. for a sufficient period of time to produce epsilon-caprolactam.

References Cited in the file of this patent

FOREIGN PATENTS 562,684    Canada _____ Sept. 2, 1958